United States Patent [19]

Hoshino et al.

[11] Patent Number: 4,717,932

[45] Date of Patent: Jan. 5, 1988

[54] FOCAL LENGTH SWITCHING TYPE CAMERA

[75] Inventors: Yasushi Hoshino, Tokyo; Makino Masamori, Hino, both of Japan

[73] Assignee: Konishiroku Photo Industry Co., Ltd., Tokyo, Japan

[21] Appl. No.: 860,647

[22] Filed: May 7, 1986

[30] Foreign Application Priority Data

May 14, 1985 [JP] Japan .............................. 60-100381
May 14, 1985 [JP] Japan .............................. 60-100384

[51] Int. Cl.$^4$ ..................... G03B 3/10; G03B 17/38
[52] U.S. Cl. ................................. 354/195.12; 354/266
[58] Field of Search ............ 354/400, 402, 187, 195.1, 354/195.12, 189.1, 189.12, 266, 268; 355/55, 56, 59

[56] References Cited

U.S. PATENT DOCUMENTS

| | | | |
|---|---|---|---|
| 2,694,352 | 11/1954 | Babbs | 354/195.12 |
| 2,725,805 | 12/1955 | Jackson et al. | 354/195.12 X |
| 4,200,378 | 4/1980 | Shenk | 354/400 |
| 4,544,249 | 10/1985 | Maemori et al. | 354/195.12 |
| 4,597,657 | 10/1986 | Wakabayashi | 354/195.12 |

Primary Examiner—W. B. Perkey
Attorney, Agent, or Firm—Jordan B. Bierman

[57] ABSTRACT

A focal length switching type camera wherein a lens unit having a photographic lens is selectively moved to one of at least two predetermined normal positions to thereby be able to switch at least two focal lengths, and a judgement device judges whether or not the lens unit is in the predetermined normal position. An actuator device is actuated if the judgement device judges that the lens unit is not in the normal position. The actuator device is alarm means or a light emitting member for giving an alarm that the lens unit is not in the normal position.

7 Claims, 12 Drawing Figures

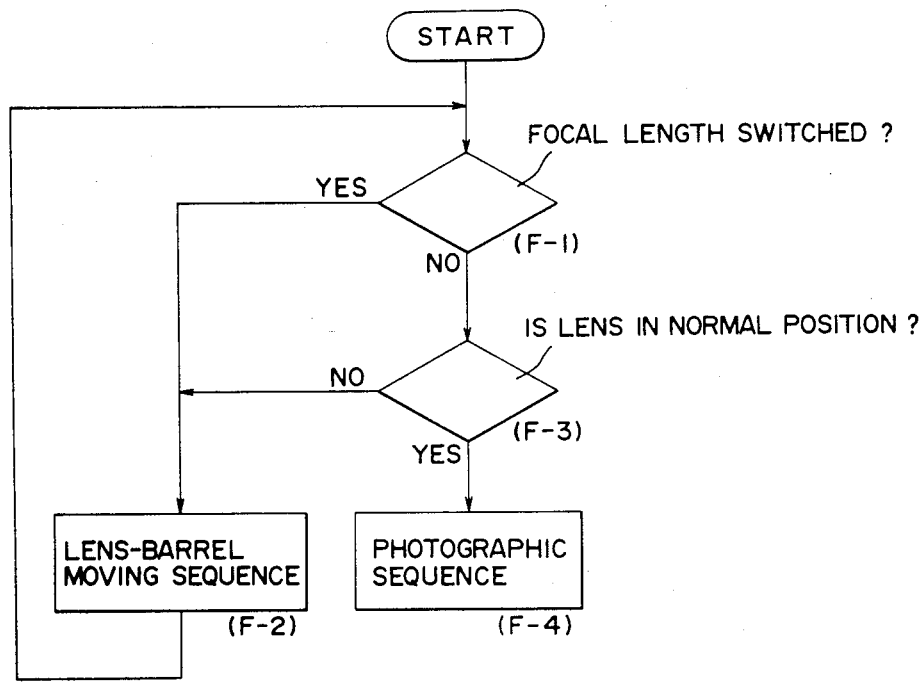

FOCAL LENGTH SWITCHING TYPE CAMERA

BACKGROUND OF THE INVENTION

1. Field of the Invention

The present invention relates to a focal length switching camera in which when a lens unit is not in a normal photographing position at the time of photographing, a user is cautioned or the unit is corrected so as to assume a normal photographing position.

2. Description of the Prior Art

In the past, a lens exchange type camera whose lens can be exchanged with a telephotolens having a long focal length when a remote object is photographed in a large size, has been widely used. However, in this kind of camera, it is cumbersome to carry an in which two kinds of focal lengths may be switched by simple operation has been recently developed.

The two-focus camera of this kind encases therein two optical systems different in focal length from each other and in photographing, either optical system is selected by manual operation. The switching operation of the optical system becomes simpler as compared with prior art camera which involves cumbersome of lens exchange but this exchange requires a certain degree of time and therefore when a moving object is photographed, one might miss a shuttering chance, and it is difficult to switch the focal length while performing framing.

In view of the foregoing, the present inventors have proposed a two-focus camera in which a one optical system is used commonly, and a motor is started by operation of a button to laterally move a main lens unit and move the rear conversion lens into and out of an optical path thereby automatically switching the focal length.

However, in such a camera which automatically switches the focal length, for example, there is a possibility that a power source voltage drops to stop the switching operation during such operation or when the camera is encased into a case, a focal length switching button comes into abutment with a part of the case and as the result the lens-barrel protrudes and remains stopped during the operation.

SUMMARY OF THE INVENTION

The present invention has been accomplished in view of the foregoing and it is an object of the invention to provide a camera in which at least two kinds of focal lengths may be electrically switched, whereby the lens unit is placed in a normal photographing position positively prior to the photographing operation. For achieving the aforesaid object, the focal length switching type camera according to the present invention is characterized in that when the switching of the focal point is not completed within a predetermined time after the focal length switching operation has been done, an alarm is issued or a user is cautioned.

The focal length switching type camera according to the present invention is further characterized in that whether or not the lens unit is in a normal photographing position is judged prior to the photographing operation, and when the unit is not in a normal photographing position, the unit is moved to the normal photographing position.

BRIEF DESCRIPTION OF THE DRAWINGS

FIG. 8 is a flow chart of the focal length switching operation of the camera in accordance with another embodiment of the present invention; and FIGS. 9 (a) and 9 (b) are respectively time charts for explanation of the focal length switching operation of the camera according to the present invention.

DESCRIPTION OF THE PREFERRED EMBODIMENTS

Embodiments of the present invention will now be described with reference to the accompanying drawings.

Figure 1:
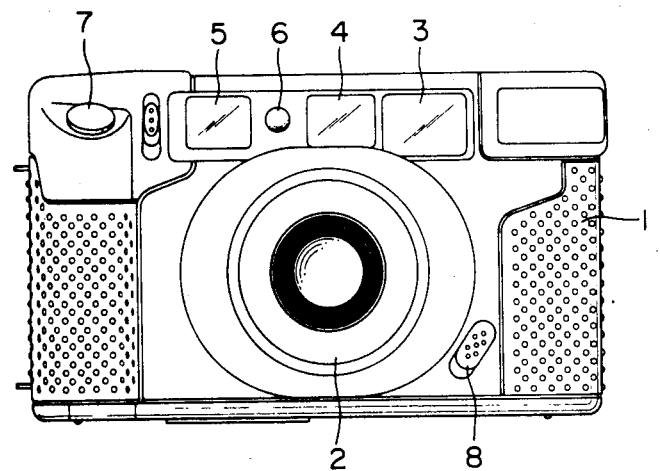
FIG. 1 is a front view of a focal length switching type camera according to the present invention.
Figure 2A:
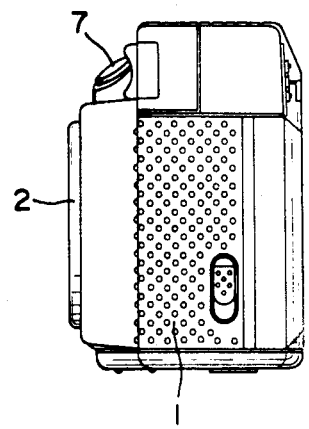
FIG. 2 (a) is a side view showing the depressed state of a lens-barrel of the camera, and FIG. 2 (b) is a side view showing the projected state of the lens-barrel of the camera.
Figure 2B:
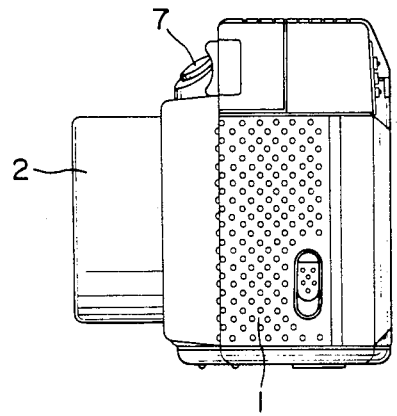

FIG. 1 is a front view of one embodiment of a two-focus camera in accordance with the present invention. FIGS. 2 (a) and 2 (b) are respectively side views of the camera when the latter has two kinds of focal length different from each other. The camera comprises a camera body 1, a lens-barrel 2 provided laterally movably in the front central portion of the body, a finder window 3, distance-measuring windows 4, 5, a light receiving element 6 such as CdS, and a release button 7 capable of performing two stage operations, wherein in the first stage operation, the distance measurement, photometry, checking of battery, checking of position and correction of position of a lens-barrel or a lens unit described later and the like are performed, and in the second stage operation, the movement of the lens unit, driving of the shutter and the like are performed. Reference numeral 8 designates an automatically returning type focal length switching button. When this button 8 is depressed in a direction as indicated by the arrow, the lens-barrel 2, when the latter is in its encased state, is projected from the state of FIG. 2 (a) to its state of FIG. 2 (b), whereas the lens-barrel 2, when the latter is in its projected state, is encased from the state of FIG. 2 (b) to the state of FIG. 2 (a).

Figure 3:
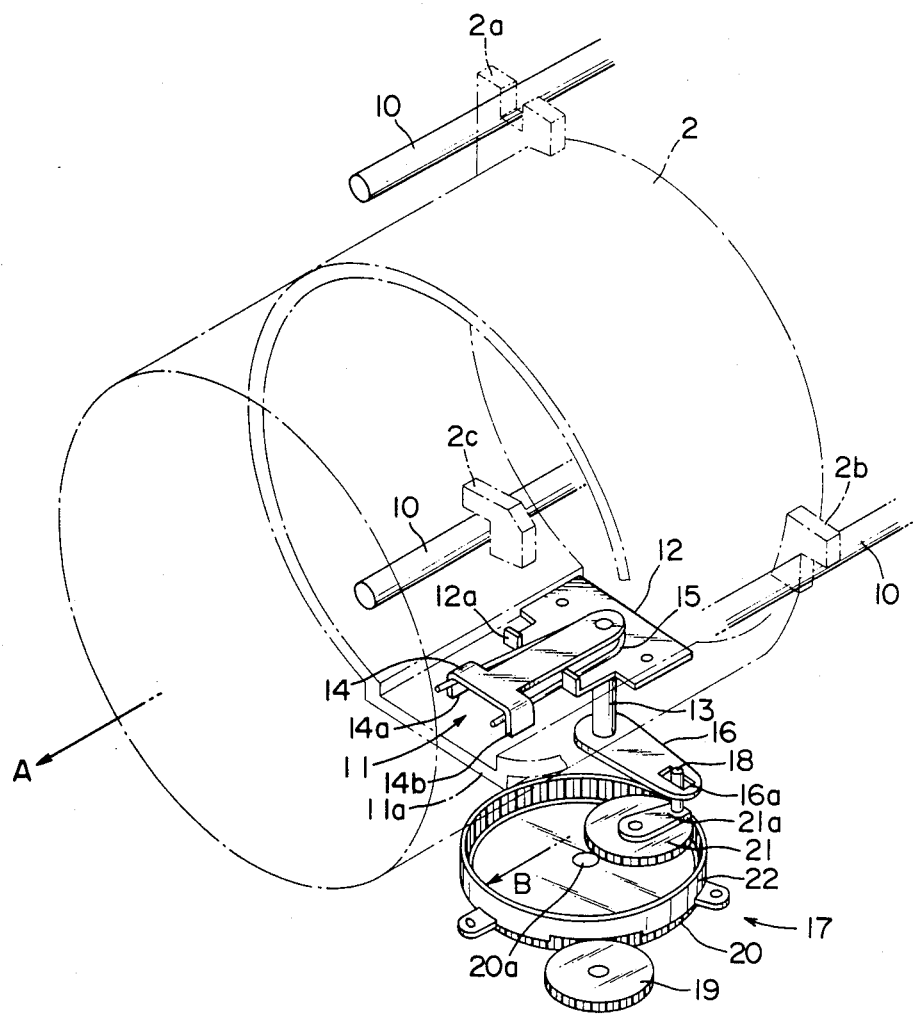
FIG. 3 is a perspective view showing the essential parts of a lens-barrel moving mechanism of the camera according to the present invention.

FIG. 3 shows a lens-barrel moving mechanism of the camera according to the present invention.

The lens-barrel 2 encases therein a lens unit, and projections 2a, 2b and 2c in the peripheral portion of the lens unit are engaged and supported on three guide shafts 10, respectively, provided on the camera body, whereby the lens unit may be moved in a direction as indicated by the arrow A while maintaining the axis thereof.

The lens-barrel 2 has a two-focus type photographing optical system incorporated therein which is moved straight forward in the direction of arrow A toward the camera body to thereby rearrange the structure of the optical system so that the focal length may be automatically switched.

The lens-barrel 2 is formed with a recess portion 11 by a flat diaphragm 11a in the peripheral surface of the bottom thereof to encase members of a driving-force transmission system for moving the lens-barrel 2.

More specifically, a plate 12 having symmetrical rising portions 12a, 12b is integrally secured by means of screws or the like to the upper surface of the diaphragm 11a, and a crank shaft 13 which extends through the plate 12 and the diaphragm 11a is rotatably mounted.

The crank shaft 13 is restricted from its axial movement by means of a control member not shown, and has a crank lever 14 secured thereto which has symmetrical descending portions 14a, 14b at a level slightly distanced from the plate 12.

Between the plate 12 and the crank lever 14 is incorporated a strong torsional spring 15 as a stroke absorbing member in a manner such that the spring 15 is loosely fitted in the crank shaft 13, and both ends of the spring are engaged by the rising portions 12a, 12b of the plate 12 and the descending portions 14a, 14b of the crank lever 14 so that the left and right portions thereof may be biased to receive the same strength. Accordingly, the crank lever 14 is in the form of an integral construction by the resilient action with respect to the plate 12, that is, the lens-barrel 2 whereby the crank lever 14 may not be turned in either left or right direction by a slight external force. These members are all encased within the space of the recess 11 and mounted so as not to interfere with the optical system within the lens-barrel 2.

On the other hand, a crank arm 16 which is substantially at a right angle to the crank lever 14 is secured to the lower end of the crank shaft 13 projected externally of the diaphragm 11a of the recess 11, and the crank arm 16 has a slot 16a with which engages a driving pin 18 as a driving member for the lens-barrel 2 operated by a planet gear mechanism 17 provided within the camera body.

This planet gear mechanism 17 is composed of a large gear 20 rotated about a shaft 20a at a given position by means of a driving gear 19, a small gear 21 mounted on the large gear 20 and a fixed internal gear 22 meshed with the small gear 21. A driving pin 18 is provided on a plate 21a secured to the small gear 21.

According to the above described arrangement, the internal gear 22 has a pitch circle diameter twice that of the small gear 21 and the driving pin 18 is positioned on the pitch circle periphery. Therefore, While the large gear 20 rotates one half, the small gear 21 rotates one half about the internal gear 22 and revolves and at the same time the small gear 21 itself also rotates one half, whereby the pin 18 moves linearly in a direction as indicated by the arrow B to provide for the amount of movement corresponding to the pitch circle diameter of the internal gear 22 but the stroke thereof is set to the length capable of sufficiently covering the amount of movement of the lens-barrel 2.

In the lens-barrel moving mechanism designed as described above, the operation for switching the focal length of the lens-barrel 2 may be accomplished as follows:

When the driving gear 19 is rotated, for example, clockwise by the power of the motor (not shown), the large gear 20 is reduced in speed and begins its counterclockwise rotation. At that time, the small gear 21 also rotates together with the large gear 20 to turn the driving pin 18 counterclockwise along the circle but it meshes with the internal gear 22 and thereby simultaneously rotates on its axis clockwise, as a consequence of which the driving pin 18 begins its linear movement in the direction of arrow B.

Thus, the driving pin 18 is to add the clockwise turning force to the crank arm 16, but the crank lever 14 is in the state integral with the lens-barrel 2 by the action of the strong torsional spring 15 thus failing to rotate the crank arm 16. After all, the crank pin 18 causes the lens-barrel 2 to move parallel to the direction of the arrow A from a predetermined one end position (barrel-depressed position).

Even after the above-described operation has continued and the large gear 20 has reached its half rotation and the lens-barrel 2 has moved to and stopped at the other position (projected position), the driving force continuously acts on the driving pin 18 to turn the crank lever 14 against the resilient action of the torsional spring 15, by which operation the driving pin 18 has completed the whole stroke operation and is ready for the succeeding returning operation.

On the other hand, also in the case where the driving pin 18 is moved in the direction opposite the direction of the arrow B by the continuous rotation, the strong torsional spring 15 also acts reversely on the crank lever 14 in a manner similar to the aforementioned case, and therefore it is possible to move the lens-barrel 2 parallel thereto to the predetermined one end position.

Even after the lens-barrel 2 has moved and stopped at the predetermined one end position, the planet gear mechanism 17 continues to be operated similarly to the previous case to turn the crank lever 14 counterclockwise against the resiliency of the torsional spring 15. Therefore, the driving pin 18 terminates its whole returning stroke and stops at the depressed position accurately.

Accordingly, in the state where the operation of the planet gear mechanism 17 stops, the driving pin 18 causes the crank lever 14 to bias in either clockwise or counterclockwise direction against the torsional spring 15 to maintain it in a slightly rotated state.

Figure 4:
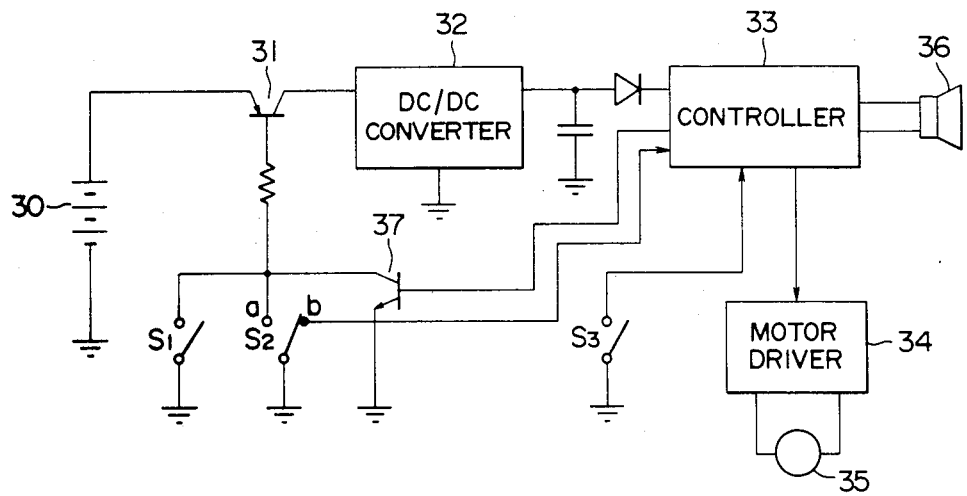
FIG. 4 shows the essential parts of an electric circuit of the camera according to the present invention.

FIG. 4 merely shows portions in connection with the driving of the lens-barrel moving mechanism of the camera according to the present invention, omitting circuit portions in connection with normal measurement of distance, photometry, shutter and driving of the lens.

In FIG. 4, reference numeral 30 designates a battery; $S_1$, a release one-stage switch which is turned on when the release button 7 (see FIG. 1) is depressed one stage while it is being otherwise turned off; $S_2$, a focal length switching switch which is normally connected to a contact a but is switched to a contact b when it is turned on by the button 8 (see FIG. 1); 31, a transistor which comes into conduction when either switch $S_1$ or switch $S_2$ is turned on; 32, a boosting DC/DC converter; 33, a controller employing a micro-computer structure which puts out an operating command to the load of the camera according to data of distance measurement and photometry; and 34, a motor driver for driving a motor 35 for moving the lens-barrel 2 in accordance with the command from the controller 33. Reference numeral 36 designates an alarm buzzer giving an alarm sound when the lens-barrel does not reach the normal photographic position within a predetermined time after operation of the focal length switching and the switching of focal length is not completed, and $S_3$ is a state detection switch which cooperates with a part of the lens-barrel moving mechanism and which is turned off when the lens-barrel 2 is in the normal position of short focal focus or long focus side and turned on when the lens-barrel is not in the normal position. Reference numeral 37 designates a transistor to self-hold the controller 33 when the switch $S_2$ assumes the contact b.

Figure 5:
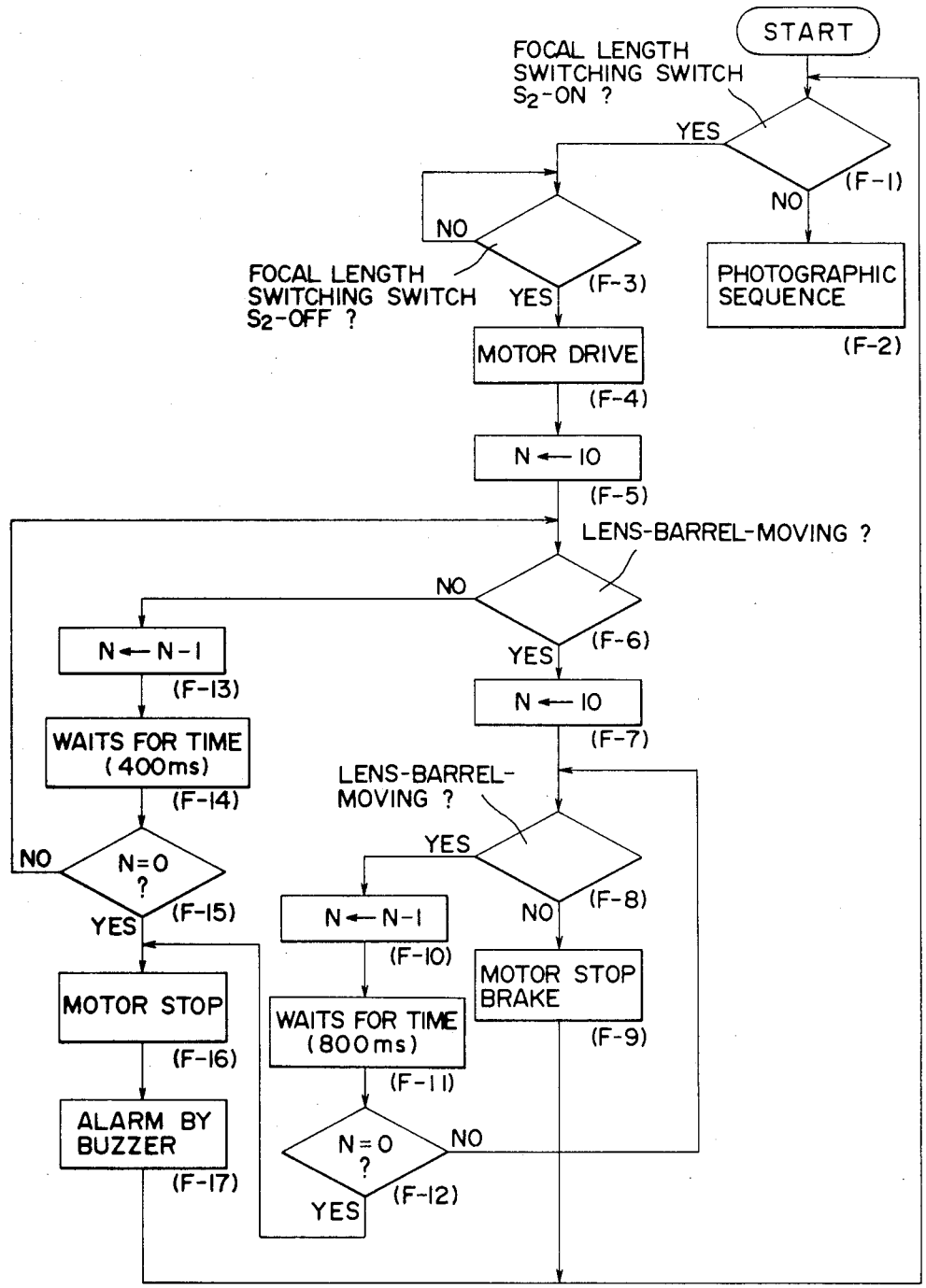
FIG. 5 is flow chart showing the focal length switching operation of the camera according to the present invention.

Next, the focal length switching operation for the camera and the alarm at the abnormal time according to the present invention will be described with reference to FIG. 5.

First, whether or not the focal length switching operation is carried out is judged by a level of a signal which enters from the focal length switching switch S2 to the controller 33 (F-1). When the device is started by the release first stage switch $S_1$, the controller 33 judges the release operation but not the lens moving operation and the operation proceeds to the normal photographic sequence (F-2).

When judgement is made of the lens moving operation upon the turn-on of the switch $S_2$ as the result of judgement in Step (F-1), one may wait till the switch $S_2$ is turned off (F-3), and a focal length switching signal applied from the controller 33 to the motor driver 34 whereby the motor 35 may be rotated in one direction and the lens-barrel is projected or depressed by the moving mechanism shown in FIG. 3 (F-4). It is to be noted that when the switch $S_2$ is turned on, the controller 33 causes the transistor 37 to be turned on and self-retained. Accordingly, even if the operator turns off the switch $S_2$ in the midst of operation, the motor 35 rotates till the lens assumes the normal position as will be described hereinafter.

Simultaneously with the driving of the motor, N=10 is put into a register within the controller 33 (F-5), and whether or not the lens-barrel 2 is moving is judged from the state of the state detection switch $S_3$ (F-6). As a result, when the lens-barrel 2 is moving, N=10 is put into a further register within the controller 33 (F-7), and the movement of the lens-barrel 2 is again judged (F-8). As a result, when an output level of the state detection switch $S_3$ assumes "H", the operator judges that the lens-barrel 2 has stopped and the motor 35 is stopped to apply brake (F-9). In this case, the controller 33 causes the transitor 37 to turn off to release the self-retaining. Accordingly, if the switch $S_2$ is on the a side, the circuit of FIG. 4 stops its operation. However, when the lens-barrel is still moving (not in the normal position), N within the register is substrated by 1 (F-10), and after the passage of a predetermined time (for example, 800 ms) (F-11), judgement is made if N is equal to 0 (N=0) (F-12). If N is not equal to 0, the step is returned to Step (F-7), and again returning to Step (F-12) via Steps (F-9, F-10 and F-11). This operation is repeated to subtract N by 1. On the other hand, when N is equal to 0 (N=0), the step proceeds to Step (F-16) which will be described hereinafter.

The step is again returned to Step (F-6), where when judgement is made so that the lens-barrel 2 is not moving, that is, it is in the normal position, N within the register is subtracted by 1 (F-13), and after passage of a predetermined time (for example, 400 ms) (F-14), discrimination is made whether or not N=0 (F-15). As the result, if N is not equal to 0, the step is returned to Step (F-6), and the step is again returned to Step (F-15) via Steps (F-13 and F-14) for repetition of the operation to subtract N by 1.

Judgement is made so that N=0 means that the movement of the lens-barrel is abnormal, and the motor 35 is stopped (F-16) and the buzzer 36 is actuated to give an abnormal alarm (F-17).

Figure 6A:
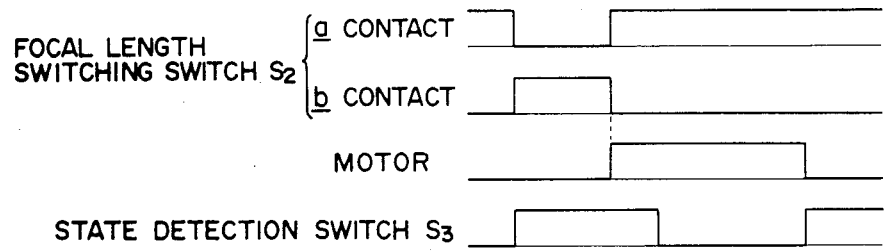
FIGS. 6 (a) and 6 (b) are respectively time charts for explanation of the focal length switching operation of the camera according to the present invention.
Figure 6B:
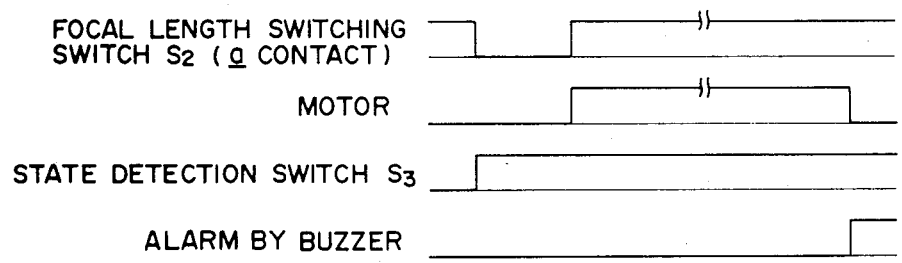

FIG. 6 (a) shows the operating timing where the movement of the lens-barrel is normal. When the focal length switching button 8 is operated to turn on the switch $S_2$ (F-1) and thereafter turn off $S_2$ (F-3), if the output level of the state detection switch $S_3$ "H" (that is, the lens-barrel 2 is in the normal position), the motor 35 is driven (F-4) and the lens-barrel 2 moves. As the result, when the lens-barrel 2 reaches the normal position (projected position or depressed position), the output level of the state detection switch $S_3$ assumes "H" from "L", and therefore the motor 35 stops.

FIG. 6 (b) shows the operating timing where the movement of the lens-barrel is not normal and the lens-barrel has stopped in the middle position.

When the focal length switching button 8 is operated to turn on the switch $S_2$ (F-1) and thereafter turn off $S_2$ (F-3), if the output level of the state detection switch is "H" (that is, the lens-barrel 2 is in the normal photographic position), the motor 35 is driven (F-4) and the lens-barrel 2 moves. However, when the lens-barrel 2 stops halfway, the output level of the state detection switch $S_3$ continuously remains unchanged not chaning from "H" to "L". Therefore, after passage of a predetermined time (for example, four seconds) from starting of the motor 35 (F-15), the power source of the motor 35 is cut off to stop the motor (F-16) and the buzzer 36 is actuated to give an alarm sound (F-17).

It is to be noted that the alarm sound caused by the alarm buzzer 36 can be either continuous or intermittent, and preferably the sound is deadened after passage of a predetermined time in view of energy saving.

As described above, the present invention provides a focal length switching type camera capable of electrically switching at least two focal lengths, in which when the focal length switching has not been completed within a predetermined time after the focal length switching operation, an alarm is given. Therefore, the user can confirm the abnormality of the lens unit position prior to the photographic operation, and if such abnormality is caused by the drop of the power source, the power source may be exchanged to prevent a photographic error.

According to a further embodiment of the present invention, the buzzer 36 is replaced by switch $S_3$ which monitors whether or not the lens is in the normal position of the short or long focus side, as shown in FIG. 4.

Figure 7:
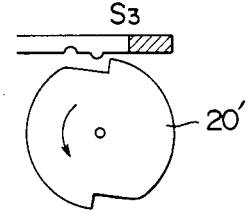
FIG. 7 is a schematic view showing the joining state of a cam and a switch provided on a lens-barrel moving mechanism shown in FIG. 3.

As shown in FIG. 7, this switch $S_3$ is opened and closed by a cam 20' provided under and integral with the large-diameter gear 20 of FIG. 3, and is turned on and off every rotation of 180° of the gear, 20. This switch $S_3$ can be provided at a position at which movement of any mechanism portion in the mechanism for lens driving member may be seen but preferably provided at a position for monitoring the operating member on the side of the driving source rather than a position at which a member (crank lever 14) for absorbing the over-stroke of the motor drive.

Next, the operation for switching the focal length of the camera in accordance with this embodiment of the present invention will be described with reference to FIGS. 8 and 9.

FOCAL LENGTH SWITCHING BY OPERATION OF A FOCAL LENGTH SWITCHING BUTTON 8

First, whether or not the focal length switching operation was carried out is descriminated by a level of a signal which is applied from the switch $S_2$ to the controller 33 (F-1), and when the focal length has been switched, a focal length switched signal is applied from the controller 33 to the motor driver 34, whereby the motor 35 is rotated in one direction and the lens-barrel is projected or depressed by the moving mechanism shown in FIG. 3 (F-2). The lens-barrel moving sequence (F-2) will be hereinafter described in detail.

When the focal length switching button 8 is operated to switch the switch $S_2$ to the contact b, the controller 33 causes the transistor 36 to be turned on and self-retained. Thus, even if the hand is released from the button 8 and the switch $S_2$ is moved away from the contact b, the controller 33 still operates and the motor 35 continues to be driven and the lens continues to moved. When the lens assumes the normal position of the short or long focus side, the switch $S_3$ is turned off.

The controller 33 receives the signal to stop the motor 35 and turn off the transistor 36, and the circuit of FIG. 4 becomes inoperative.

PHOTOGRAPHIC OPERATION BY OPERATION OF A RELEASE BUTTON

On the other hand, when the focal length switching operation is not carried out, whether or not the lens barrel 2 is in the normal position of the short or long focus side is discriminated by the output state of the state detection switch $S_3$ (F-3), and if the lens-barrel is in the normal position, one may judge that the lens-barrel 2 is in the normal position of either projected or depressed position and the step proceeds to the normal photographic sequence (F-4). However, when judgement is made in Step (F-3) that the lens-barrel 2 is not in the normal position, one may judge that the lens-barrel 2 projects halfway and stops at the middle position between the projected position and the depressed position, and the step proceeds to the lens-barrel moving sequence (F-2).

In this Step (F-2), as shown in FIG. 9 (a), when the release first switch $S_1$ is turned on by depression of the release button 7, the motor 35 is driven so that the lens-barrel 2 moved from the middle position toward the projected or depressed position. When the lens-barrel 2 stops at either position, the state detection switch $S_3$ is turned off, at which time the motor 35 stops. In this case, movement of the lens-barrel 2 toward the projected position or conversely toward the depressed position is determined by the moving mechanism shown in FIG. 3, and when the lens-barrel 2 stops halfway where it is projected from the depressed position, the lens-barrel moves toward the projected position whereas when the lens-barrel stops halfway where the former is depressed toward the depressed position, the lens-barrel moves toward the depressed position. Even while the lens position is being corrected and the lens has been moved, in a route of Step F-1 → Step F-3 → Step F-2, when the release button is kept depressed, the flow is again returned to the start position as shown in FIG. 8. Then, in this case, the lens is positioned at the normal position, and therefore the step proceeds to the photographic sequence F-4 via Steps F-1 and F-3 for photographing. That is, in this camera, when the release button is depressed in the state where the lens is not in the normal position, the lens is automatically positioned at the normal position and then the shutter is moved down.

Separately therefrom, where the depression button is operated to move the lens, the operating mode shown in the time chart of FIG. 9 results. When the focal length switching button 8 is operated, the focal length switching switch $S_2$ is changed from on to off when the button 8 is automatically returned whereby the motor 35 is driven by the command which is released from the controller 33 to move the lens-barrel 2. In this case, the moving direction of the lens-barrel is the same as the case where the release button 7 is operated as described above.

In order to move the lens-barrel at the middle position to the normal projected or depressed position, an exclusive-use operating button can be provided in addition to the release button and the focal length switching button as in the above-described embodiment.

As described above, in accordance with the aforesaid embodiment of the present invention, there is provided a focal length switching type camera capable of switching at least two kinds of focal lengths, in which whether or not the lens unit is in the normal photographic position is judged prior to photographic operation, and when the lens unit is not in the normal photographic position, the lens unit may be moved to the normal photographic position. Therefore, the lens unit is to be positively set to the normal photographic position prior to the photographic operation, and thus the photographing may be always made positively without a photographic error resulting from out-of-focus.

What is claimed is:

1. In a focal length switching type camera having shutter means, release operating means, and a lens unit which is selectively moved to one of at least two photographic positions, wherein the photographing is carried out when the lens unit is moved to one of said positions, which is a normal photographic position, the improvement which comprises a first detecting means for detecting that said release operating means has been operated, a driving source for driving said lens unit, a second detecting means for detecting that said lens unit is in said normal photographic position, and control means having judgment means for judging by a signal from said second detecting means whether said lens unit is in said normal photographic position, actuator means for said lens unit operating said driving source when said release operating means has been operated and said judgment means has determined that no detecting signal is obtained from said second detecting means, and said driving source is effected in an inoperated state according to the detecting signal from said second detecting means.

2. The camera as set forth in claim 1 wherein said actuator means is alarm means for giving an alarm that the lens unit is not in the normal position.

3. The camera as set forth in claim 1 wherein said actuator means is lens unit moving means for moving the lens unit to a predetermined normal position, and said judgement means is actuated by operating means operated when photographing starts.

4. In a focal length switching type camera wherein the photographing is carried out by selectively positioning a lens unit in one of at least two photographing positions to change a focal length, one of said photographic positions being a normal photographic position, the improvement which comprises a release operating means, a first detecting means for detecting that said release operating means has been operated, a second detecting means for detecting that means for selecting the focal length has been operated, a third detecting means for detecting said lens unit is in said normal photographic position, switching means which is turned ON by the operation of said first detecting means or said second detecting means, a DC-DC converter connected to said switching means, control means which is actuated through said DC-DC converter, said control means including judging means for judging by a signal from said third detecting means whether said lens unit is in said normal photographic position, holding means for self-holding an operating state of said control means, and a driving source for driving said lens unit, said driving source being ON-OFF controlled by said control means, wherein said lens unit is moved by operating said driving source when said first detecting means or said second detecting means has been switched ON and said judgment means has determined that no detecting signal is obtained from said third detecting means, and said driving source is effected in an inoperated state according to the detecting signals from said third detecting means.

5. The camera of claim 4 further comprising an alarm means actuated by said control means.

6. The camera as set forth in claim 5 wherein said alarm means is a buzzer.

7. The camera as set forth in claim 5 wherein said alarm means is a light emitting member.

* * * * *